(12) United States Patent
Miyashita et al.

(10) Patent No.: US 7,403,219 B2
(45) Date of Patent: Jul. 22, 2008

(54) DRIVING LANE RECOGNIZER AND DRIVING LANE RECOGNIZING METHOD

(75) Inventors: Michihiro Miyashita, Susono (JP); Makoto Nishida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 669 days.

(21) Appl. No.: 11/119,762

(22) Filed: May 3, 2005

(65) Prior Publication Data

US 2005/0256636 A1 Nov. 17, 2005

(30) Foreign Application Priority Data

May 11, 2004 (JP) ............... 2004-141536

(51) Int. Cl.
*H04N 7/18* (2006.01)
(52) U.S. Cl. ...................... 348/148; 340/903
(58) Field of Classification Search ........... 348/118, 348/119, 148; 340/903, 905; 701/23, 28
See application file for complete search history.

(56) References Cited

U.S. PATENT DOCUMENTS

| | | | | |
|---|---|---|---|---|
| 4,766,421 A | * | 8/1988 | Beggs et al. ............ | 340/904 |
| 6,577,334 B1 | * | 6/2003 | Kawai et al. ............ | 348/148 |
| 6,882,287 B2 | * | 4/2005 | Schofield ............... | 340/903 |
| 2005/0169501 A1 | * | 8/2005 | Fujii et al. ............ | 382/104 |
| 2005/0273264 A1 | * | 12/2005 | Gern et al. ............ | 701/301 |
| 2006/0152346 A1 | * | 7/2006 | Maass et al. ........... | 340/425.5 |

FOREIGN PATENT DOCUMENTS

| JP | A-08-320997 | 12/1996 |
|---|---|---|
| JP | A-2001-014595 | 1/2001 |

* cited by examiner

*Primary Examiner*—Nhon T Diep
(74) *Attorney, Agent, or Firm*—Oliff & Berridge, PLC

(57) ABSTRACT

A driving lane recognizer 1 is arranged to detect a white line 30 on a driving road 20 on the basis of an image taken of the driving road 20. The driving lane recognizer 1 sets a near region 41 and a far region 42 adjacent to each other along a vehicle traveling direction in the image, detects a length of white line 30 in each of the near region 41 and the far region 42, and determines a type of white line 30 on the basis of the length of white line 30 in the near region 41 and the length of white line 30 in the far region 42. This permits the recognizer to determine the type of white line 30 on the basis of one image and to determine the type of white line 30 without use of past detection data or the like.

10 Claims, 5 Drawing Sheets

*Fig.5*

|  |  | FAR REGION | |
|---|---|---|---|
|  |  | OVER PREDETERMINED VALUE | PREDETERMINED VALUE AND BELOW |
| NEAR REGION | OVER PREDETERMINED VALUE | SOLID LINE | DASHED LINE |
|  | PREDETERMINED VALUE AND BELOW | DASHED LINE | NO DETECTION |

DRIVING LANE RECOGNIZER AND DRIVING LANE RECOGNIZING METHOD

TECHNICAL FIELD

The present invention relates to a driving lane recognizer and a driving lane recognizing method for detecting a lane marker on a vehicle's driving road.

BACKGROUND ART

One of the conventionally known apparatus for detecting a lane marker on a driving road is a driving lane detector for vehicle arranged to take an image of a state of a driving road with a video camera set in the front part of the vehicle and to detect a type of a white line on the driving road on the basis of the image, as described in Japanese Patent Application Laid-Open No. 2000-14595. This is a device that detects candidate points for a white line by image processing of the image and that determines whether the white line is a solid line or a dashed line, based on the white line candidate point data and past detection rate data of white line candidate points.

DISCLOSURE OF THE INVENTION

Problem to be Solved by the Invention

However, this device needs to store the past detection rate data of white line candidate points in order to determine the type of the white line, and is thus unable to determine the type of the white line without the past detection rate data of white line candidate points. In addition, it takes a considerable time for determining the type of the white line if the vehicle is traveling at low speed.

An object of the present invention is therefore to provide a driving lane recognizer and a driving lane recognizing method capable of determining a type of a lane marker without use of past data.

Means for Solving the Problem

Namely, a driving lane recognizing apparatus according to the present invention is a driving lane recognizer for detecting a lane marker provided on a driving road on the basis of an image taken of the driving road, the driving lane recognizer comprising: lane marker detector that detects a length of a lane marker in each of a near region and a far region adjacently set along a vehicle traveling direction in the image; and determining element that determines a type of the lane marker on the basis of the length of the lane marker in the near region and the length of the lane marker in the far region, which are detected by the lane marker detector.

a driving lane recognizing method according to the present invention is a driving lane recognizing method for detecting a lane marker provided on a driving road on the basis of an image taken of the driving road, the driving lane recognizer comprising: lane marker detecting step for detecting a length of a lane marker in each of a near region and a far region adjacently set along a vehicle traveling direction in the image; and determining step for determining a type of the lane marker on the basis of the length of the lane marker in the near region and the length of the lane marker in the far region, which are detected by the lane marker detecting step.

According to the present invention, the driving lane recognizer is configured to detect the length of the lane marker in each of the near region and the far region of the image and to determine the type of the lane marker on the basis of the lengths of the lane marker thus detected, whereby the driving lane recognizer is able to determine the type of the lane marker on the basis of one image and thus to determine the type of the lane marker without use of past detection data.

The driving lane recognizer according to the present invention is also characterized in that when the lengths of the lane marker detected in both of the near region and the far region are longer than a predetermined value, the determining element determines that the lane marker is a solid line.

The driving lane recognizing method according to the present invention is also characterized in that when the lengths of the lane marker detected in both of the near region and the far region are longer than a predetermined value, the determining step determines that the lane marker is a solid line.

The driving lane recognizer according to the present invention is also characterized in that when the length of the lane marker detected in one of the near region and the far region is longer than the predetermined value and when the length of the lane marker detected in the other is not more than the predetermined value, the determining element determines that the lane marker is a dashed line.

The driving lane recognizing method according to the present invention is also characterized in that when the length of the lane marker detected in one of the near region and the far region is longer than the predetermined value and when the length of the lane marker detected in the other is not more than the predetermined value, the determining step determines that the lane marker is a dashed line.

According to these aspects of the invention, the driving lane recognizer compares the lengths of the lane marker in the near region and in the far region with the predetermined value, whereby the driving lane recognizer is able to accurately determine whether the lane marker is a solid line or a dashed line.

The driving lane recognizer according to the present invention is also characterized in that lengths of the near region and the far region in the vehicle traveling direction are set to be longer than a line-drawn part of a dashed line and shorter than a lineless part of the dashed line. Here the length of the line-drawn part and the length of the lineless part of the dashed line mean lengths in the vehicle traveling direction.

The driving lane recognizing method according to the present invention is also characterized in that lengths of the near region and the far region in the vehicle traveling direction are set to be longer than a line-drawn part of a dashed line and shorter than a lineless part of the dashed line.

The driving lane recognizer according to the present invention is also characterized in that lengths of the near region and the far region in the vehicle traveling direction are set to be longer than a lineless part of a dashed line and shorter than a sum of a line-drawn part and a lineless part of the dashed line. Here the length of the lineless part of the dashed line and the length of the sum of the line-drawn part and the lineless part of the dashed line mean lengths in the vehicle traveling direction.

The driving lane recognizing method according to the present invention is also characterized in that lengths of the near region and the far region in the vehicle traveling direction are set to be longer than a lineless part of a dashed line and shorter than a sum of a line-drawn part and a lineless part of the dashed line.

According to these aspects of the invention, where the lane marker is a dashed line, the image tends to be in a state in which only a lineless part is present in one of the near region and the far region and in which only a line-drawn part is present in the other. For this reason, the lengths of the white line detected in the near region and in the far region tend to be above or below the predetermined value, which improves the detection accuracy of the dashed line.

Effect of the Invention

The present invention enables the apparatus to make a determination on the type of the lane marker without use of past data.

BRIEF DESCRIPTION OF THE DRAWINGS

FIG. 5 is a drawing to illustrate a white line type determining process in the flowchart of FIG. 2.

Best Mode for Carrying Out the Invention

An embodiment of the present invention will be described below in detail with reference to the accompanying drawings. The same elements will be denoted by the same reference symbols in the description of the drawings, without redundant description.

Figure 1:
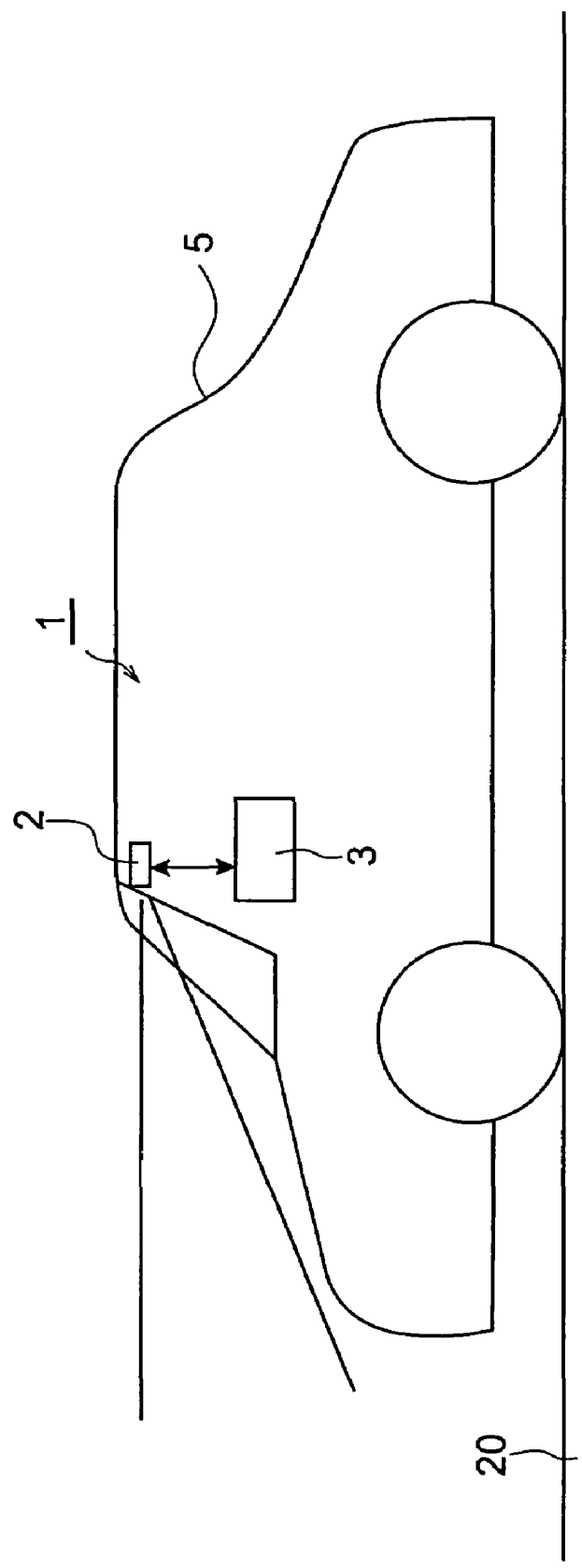
FIG. 1 is a schematic diagram of a configuration of a driving lane recognizer according to an embodiment of the present invention.

FIG. 1 is a schematic diagram to show a configuration of a driving lane recognizer according to an embodiment of the present invention.

As shown in FIG. 1, the driving lane recognizer 1 according to the present embodiment is an apparatus mounted on a vehicle 5, which detects a white line as a lane marker on a driving road 20 on which the vehicle 5 is traveling, and which recognizes a driving lane on the basis of the detection result. The "lane marker" means a border line of a lane among road signs, and embraces white lines, and lines of other colors, e.g., yellow lines.

As shown in FIG. 1, the driving lane recognizer 1 is provided with an image taking unit 2. The image taking unit 2 functions as an imaging means for imaging surrounding circumstances around the vehicle and is installed, for example, so as to take a forward image ahead the vehicle 5. This image taking unit 2 can be, for example, a C-MOS camera.

The image taking unit 2 is connected to ECU (Electronic Control Unit) 3. ECU 3 controls the entire system and is composed, for example, of a CPU, a ROM, a RAM, an input signal circuit, an output signal circuit, a power supply circuit, and so on. ECU 3 is a unit that receives an image from the image taking unit 2, performs image processing of the image, and detects a white line provided on the vehicle's driving road.

The operation of the driving lane recognizer and the driving lane recognizing method according to the present embodiment will be described below.

Figure 2:
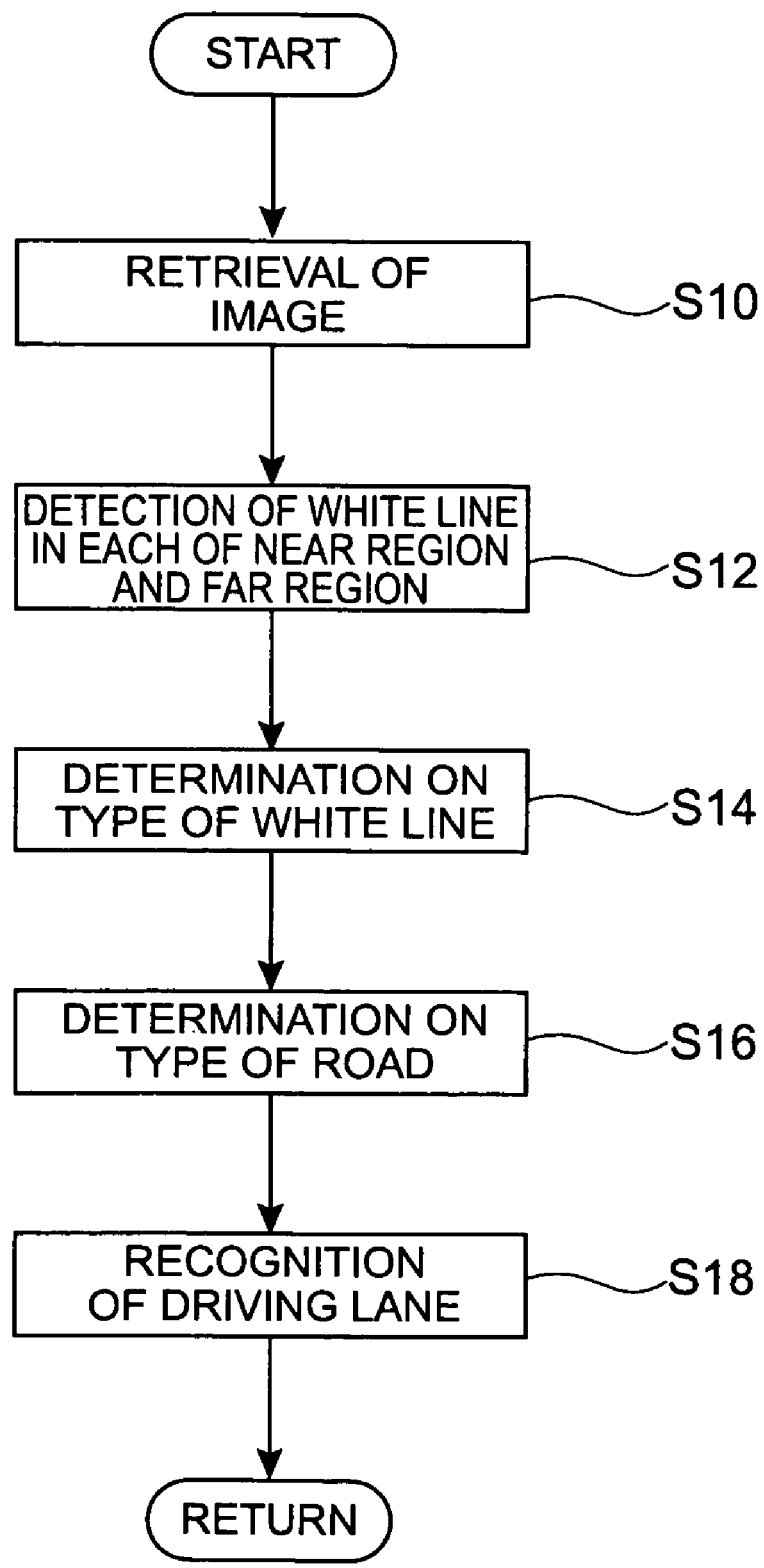
FIG. 2 is a flowchart showing an operation of the driving lane recognizer of FIG. 1.
Figure 3:
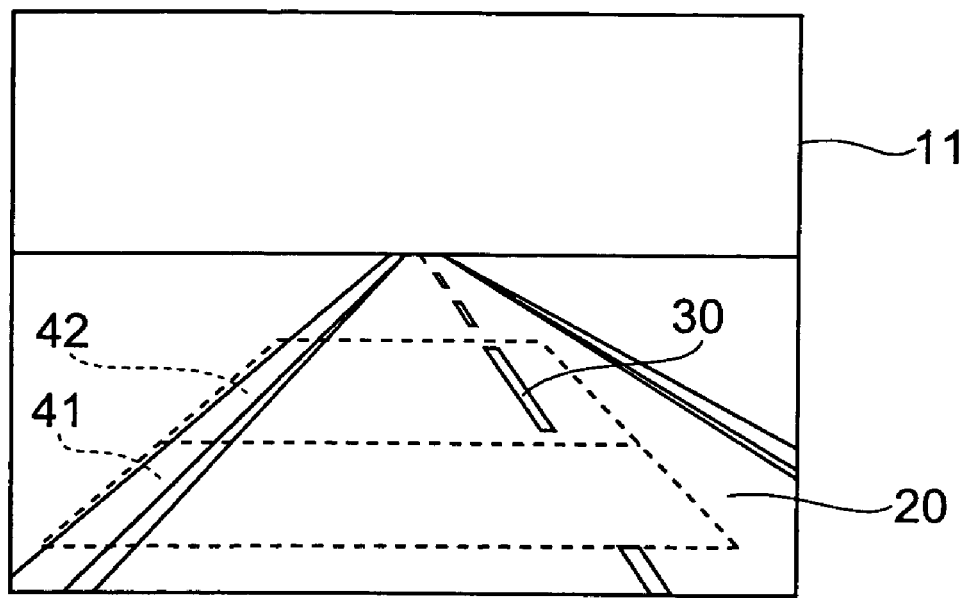
FIG. 3 is a drawing to illustrate an image in a control process of the flowchart of FIG. 2.
Figure 4:
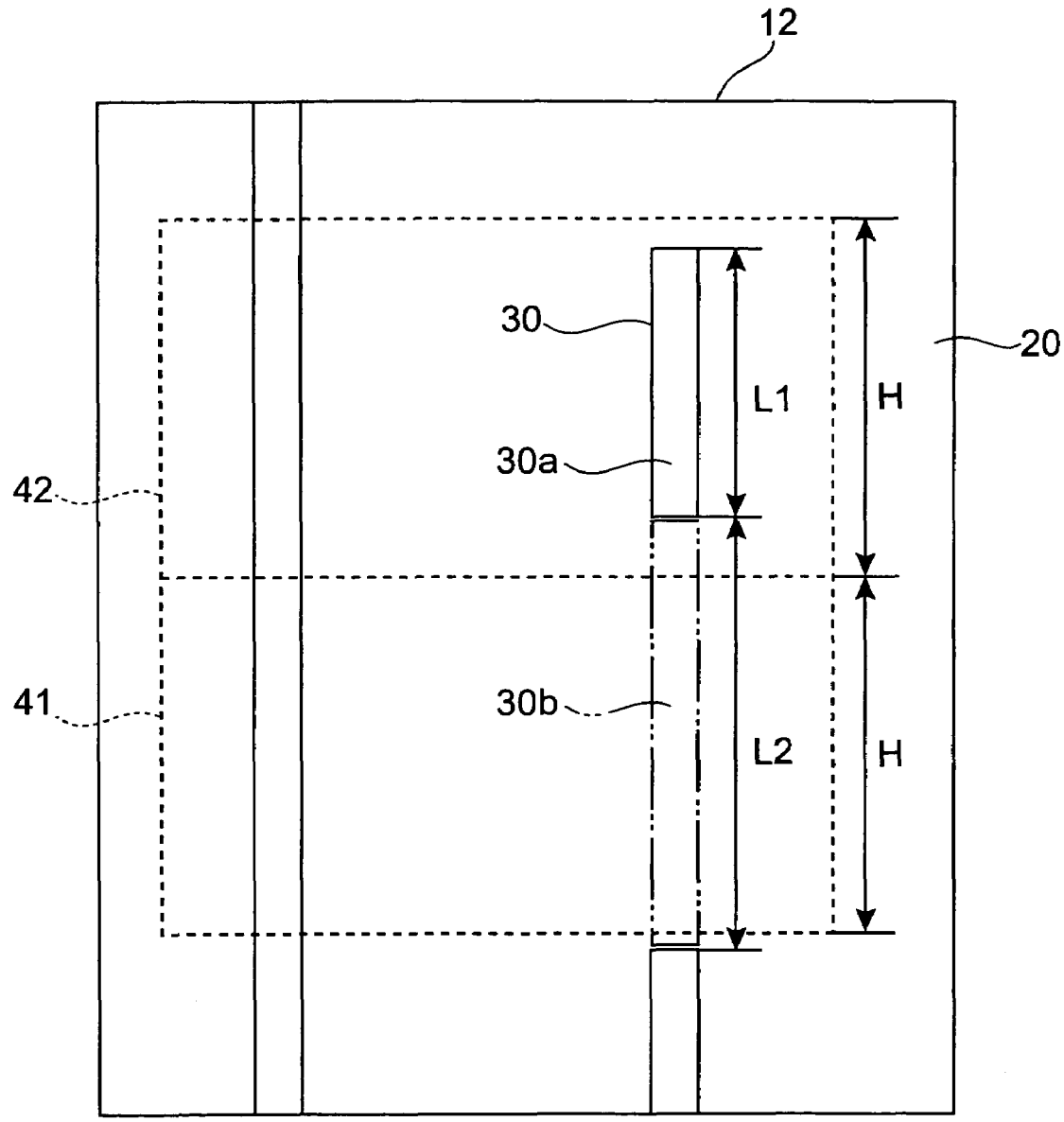
FIG. 4 is a drawing to illustrate an image after transformation in the control process of the flowchart of FIG. 2.

FIG. 2 is a flowchart showing the operation of the driving lane recognizer according to the present embodiment. FIGS. 3 and 4 are imagery drawings of images in the control process of FIG. 2. The control process in FIG. 2 is executed by ECU 3.

First, an image is retrieved, as shown at S10 in FIG. 2. This retrieval of the image is carried out in such a manner that ECU 3 receives an image taken by the image taking unit 2 and reads the image signal in the form of digital image data. On that occasion, where the vehicle is traveling along driving road 20, the image 11 is displayed so that the driving road 20 is vertically directed, as shown in FIG. 3. The driving road 20 is provided with white line 30.

Then the ECU moves to S12 in FIG. 2 to perform a white line detecting process in each of near region 41 and far region 42. As shown in FIG. 3, the near region 41 and the far region 42 are set as respective, individual windows so that they are adjacent to each other along the vehicle traveling direction in one image 11. The white line detecting process is a process of detecting a length of white line 30 in each of the near region 41 and the far region 42, based on image processing of the image 11.

This white line detecting process is done, for example, by successively carrying out image processing consisting of extraction of edge points, coordinate transformation, detection of white line, and detection of white line length. The extraction of edge points is a process of extracting edge points in the image 11 by use of a differential filter or the like. The coordinate transformation is a process of performing such a coordinate transformation as to transform the image 11 to an image as viewed from immediately above the driving road 20. For example, it is implemented by setting the width direction of the driving road 20 as an X-axis and the vehicle traveling direction on the driving road 20 as a Y-axis. This coordinate transformation process transforms the image 11 to a transformed image 12 as a plan view from immediately above the driving road 20, as shown in FIG. 4.

The white line detection is a process of subjecting the extracted edge points to straight line approximation to detect white line 30 in each of the near region 41 and the far region 42. A technique of the straight line approximation is, for example, a method of calculating the number of edge points on a straight line and outputting a straight line with the largest number of points as a result of the straight line approximation, like the Hough transform.

The white line length detection is a process of detecting the length of white line 30 in each of the near region 41 and the far region 42. This white line length detection can be implemented, for example, by taking a ratio of the number of edge points on the straight line detected by the white line detection, to the number of points of the straight line on the screen, i.e., by determining the ratio of the length of the white line to the length of the straight line on the screen. In the case of FIG. 4, the result of the white line detection process is that the length of white line 30 in the near region 41 is zero and that the length of white line 30 in the far region 42 is L1.

Then the ECU moves to S14 in FIG. 2 to perform a white line type determining process. The white line type determining process is a process of determining a type of white line 30, by which the type of white line 30 is determined based on the length of white line 30 in the near region 41 and the length of white line 30 in the far region 42, e.g., whether white line 30 is a solid line or a dashed line is determined. This white line type determining process is carried out, for example, as described below.

As shown in FIG. 5, it is determined whether the lengths of white line 30 detected in both of the near region 41 and the far region 42 are longer than a predetermined value, and whether white line 30 is a solid line or a dashed line is determined according to a case where the lengths of white line 30 detected in both of the near region 41 and the far region 42 are longer than the predetermined value, a case where the length of white line 30 detected in either one of the near region 41 and the far region 42 is longer than the predetermined value, and a case where the lengths of white line 30 detected in both of the near region 41 and the far region 42 are not more than the predetermined value.

In the case where the lengths of white line 30 detected in both of the near region 41 and the far region 42 are longer than the predetermined value, it is determined that the white line 30 is a solid line. The predetermined value set on this occasion is, for example, a length equivalent to a half length (L1/2) of a line-drawn part 30a. It is 4 m on highways and 3 m on general roads.

This predetermined value is preferably set based on geographical information of a navigation system. Specifically, a type of a road on which the vehicle is currently traveling is detected based on the geographical information and the predetermined value is set according to the type of the road. This enables the appropriate process of determining the type of the white line. In addition to the setting based on the geographical information of the navigation system, the predetermined value may also be set as follows: the length of white line 30 is detected by a road type determining process described later, whether the vehicle is traveling on a highway or on a general road is determined based on the length detected, and the predetermined value is set using the result of the determination. It is also possible to use an identical predetermined value without identification of either a highway or a general road.

In the white line type determining process, in the case where the length of white line 30 detected in either one of the near region 41 and the far region 42 is longer than the predetermined value and where the length of white line 30 detected in the other is not more than the predetermined value, it is determined that the white line 30 is a dashed line.

In the white line type determining process, in the case where the lengths of white line 30 detected in both of the near region 41 and the far region 42 are not more than the predetermined value, it is determined, for example, that there is no detection result of a type of white line 30. In this case, it is preferable to use a detection result prior to the current detection, e.g., a previous detection result, as a current detection result.

By comparing the lengths of white line 30 in the near region 41 and in the far region 42 with the predetermined value in this manner, whether white line 30 is a solid line or a dashed line can be accurately determined.

This white line type determining process at S14 is not limited to the above-described determination technique, and can be any other determination technique as long as it can determine whether white line 30 is a dashed line or a solid line. For example, whether white line 30 is a solid line or a dashed line may be determined based on a sum of the lengths of white line 30 detected in the near region 41 and in the far region 42. In this case, it is determined that the white line is a solid line when the sum of the lengths of white line 30 is not less than a predetermined length, and that the white line is a dashed line when the sum of the lengths of white line 30 is shorter than the predetermined length.

In this white line type determining process, it is preferable in order to enhance the accuracy of the determination on the type of the white line that the lengths H in the vehicle traveling direction of the near region 41 and the far region 42 be set to be longer than a line-drawn part 30a of the dashed line and shorter than a lineless part 30b of the dashed line. It is also preferable that the lengths H in the vehicle traveling direction of the near region 41 and the far region 42 be set to be longer than a lineless part 30b of the dashed line and shorter than the length of the sum (L1+L2) of a line-drawn part 30a and a lineless part 30b of the dashed line. Here the length of the line-drawn part 30a of the dashed line, the length of the lineless part 30b of the dashed line, and the length of the sum of the line-drawn part 30a and the lineless part 30b of the dashed line mean lengths in the vehicle traveling direction.

By setting the lengths H of the near region 41 and the far region 42 in this manner, where white line 30 is a dashed line, it is easy to cause a state in which only a lineless part 30b is present in one of the near region 41 and the far region 42 and in which only a line-drawn part 30a is present in the other. For this reason, the lengths of white line 30 detected in the near region 41 and in the far region 42 tend to be above or below the predetermined value, which improves the accuracy of detection of the dashed line.

Then the ECU moves to S16 in FIG. 2 to perform a road type determining process. This road type determining process is a process of determining a type of driving road 20 on the basis of the lengths of white line 30 detected by the white line detecting process at S12. For example, supposing the white line 30 is a dashed line, when the length of the line-drawn part 30a in the dashed line is a length equivalent to 6 m, the driving road 20 is determined to be a general road; when the length of the line-drawn part 30a is a length equivalent to 8 m, the driving road 20 is determined to be a highway. The accuracy of the determination on the type of the road may be improved by comparing the result of the type of the road determined by the road type determining process with the result of the type of the road detected by the navigation system.

Then the control unit moves to S18 in FIG. 2 to perform a driving lane recognition process, based on the white line detection result, and then completes the control process. As the driving lane recognition process, the control unit calculates values indicating the shape of the road, for example, such as the width and the radius R of curvature of the driving lane. The driving lane can be recognized more accurately by switching parameter values used in the calculation of the values indicating the shape of the road, according to the type of the road detected at S16.

As described above, the driving lane recognizer 1 of the present embodiment is configured to set the near region 41 and the far region 42 in the image, to detect the length of white line 30 in each of these near region 41 and far region 42, and to determine the type of white line 30 on the basis of the lengths of white line 30 thus detected, whereby the driving lane recognizer is able to determine the type of white line 30 on the basis of one image and to determine the type of white line 30 without use of past detection data or the like. Since the driving lane recognizer is able to determine the type of white line 30 on the basis of image data of one frame and does not have to retrieve a plurality of image data, it is able to quickly perform the determination process.

In addition, the driving lane recognizer determines the type of white line 30 by comparing the lengths of white line 30 detected in the near region 41 and in the far region 42 with the predetermined value, whereby it is able to accurately determine whether white line 30 is a solid line or a dashed line.

When the left and right lane markers on the driving lane are solid lines with recognition that the vehicle is traveling on a highway, on the basis of the result of detection of white line 30, the driving lane recognizer 1 of the present embodiment is able to recognize that the traveling part is an interim common use part (a portion used for opposite driving on a highway). In addition, when the left lane marker on the driving lane is a solid line and the right lane marker a dashed line, the driving lane recognizer is able to recognize that the vehicle is traveling on the left driving lane. In reverse, when the left lane marker on the driving lane is a dashed line and the right lane marker a solid line, the recognizer is able to recognize that the vehicle is traveling on the right driving lane. By accurately recognizing either a dashed line or a solid line in this manner, it becomes feasible to more properly perform the control by the vehicle operating system.

Particularly, the driving lane recognizer 1 of the present embodiment is effectively used as a part of a vehicle operation support system. For example, a traveling position of the vehicle relative to driving road 20 can be detected on the basis of the result of detection of white line 30 by the driving lane recognizer 1 of the present embodiment. Therefore, when the traveling position of the vehicle deviates either to the left or to the right, a steering control is carried out so as to correct it to implement a steering support, whereby it is feasible to secure safe vehicle driving.

The present embodiment described the case where in the white line detection process at S12 the white line length detection was carried out after the coordinate transformation of the image 11, but the white line length detection may be carried out before the coordinate transformation. It is also possible to carry out the white line length detection without coordinate transformation.

The present embodiment described the case where the lengths of white line 30 were detected and the type of the white line was determined based thereon, but the driving lane recognizer may also be configured to detect the lengths of a line of any other color than white line 30 and to determine the type of the line, as long as the line is a lane marker.

What is claimed is:

1. A driving lane recognizer for detecting a lane marker provided on a driving road on the basis of an image taken of the driving road, the driving lane recognizer comprising:
    lane marker detector that detects a length of a lane marker in each of a near region and a far region adjacently set along a vehicle traveling direction in the image; and
    determining element that determines a type of the lane marker on the basis of the length of the lane marker in the near region and the length of the lane marker in the far region, which are detected by the lane marker detector.

2. The driving lane recognizer according to claim 1, wherein when the lengths of the lane marker detected in both of the near region and the far region are longer than a predetermined value, the determining element determines that the lane marker is a solid line.

3. The driving lane recognizer according to claim 2, wherein when the length of the lane marker detected in one of the near region and the far region is longer than the predetermined value and when the length of the lane marker detected in the other is not more than the predetermined value, the determining element determines that the lane marker is a dashed line.

4. The driving lane recognizer according to claim 1, wherein lengths of the near region and the far region in the vehicle traveling direction are set to be longer than a line-drawn part of a dashed line and shorter than a lineless part of the dashed line.

5. The driving lane recognizer according to claim 1, wherein lengths of the near region and the far region in the vehicle traveling direction are set to be longer than a lineless part of a dashed line and shorter than a sum of a line-drawn part and a lineless part of the dashed line.

6. A driving lane recognizing method for detecting a lane marker provided on a driving road on the basis of an image taken of the driving road, the driving lane recognizing method comprising:
    lane marker detecting step for detecting a length of a lane marker in each of a near region and a far region adjacently set along a vehicle traveling direction in the image; and
    determining step for determining a type of the lane marker on the basis of the length of the lane marker in the near region and the length of the lane marker in the far region, which are detected by the lane marker detecting step.

7. The driving lane recognizing method according to claim 6, wherein when the lengths of the lane marker detected in both of the near region and the far region are longer than a predetermined value, the determining step determines that the lane marker is a solid line.

8. The driving lane recognizing method according to claim 7, wherein when the length of the lane marker detected in one of the near region and the far region is longer than the predetermined value and when the length of the lane marker detected in the other is not more than the predetermined value, the determining step determines that the lane marker is a dashed line.

9. The driving lane recognizing method according to claim 6, wherein lengths of the near region and the far region in the vehicle traveling direction are set to be longer than a line-drawn part of a dashed line and shorter than a lineless part of the dashed line.

10. The driving lane recognizing method according to claim 6, wherein lengths of the near region and the far region in the vehicle traveling direction are set to be longer than a lineless part of a dashed line and shorter than a sum of a line-drawn part and a lineless part of the dashed line.

* * * * *